(12) United States Patent
McWhirter et al.

(10) Patent No.: US 6,966,983 B1
(45) Date of Patent: Nov. 22, 2005

(54) CONTINUOUS MULTISTAGE THERMOPHILIC AEROBIC SLUDGE DIGESTION SYSTEM

(75) Inventors: John R. McWhirter, Boalsburg, PA (US); Prakash G Balan, Dunn Loring, VA (US); Bradley A. Swope, State College, PA (US)

(73) Assignee: Mixing and Mass Transfer Technologies, LLC, Boalsburg, PA (US)

( * ) Notice: Subject to any disclaimer, the term of this patent is extended or adjusted under 35 U.S.C. 154(b) by 0 days.

(21) Appl. No.: 10/956,379

(22) Filed: Oct. 1, 2004

(51) Int. Cl.$^7$ .............................................. C02F 3/20
(52) U.S. Cl. ....................... 210/150; 210/220; 210/255
(58) Field of Search ................................ 210/150, 151, 210/220, 255, 620–629; 261/2, 3, 5, 6

(56) References Cited

U.S. PATENT DOCUMENTS

| | | | |
|---|---|---|---|
| 3,745,113 A | 7/1973 | Fuchs | |
| 4,246,099 A | 1/1981 | Gould et al. | |
| 4,277,342 A | 7/1981 | Hayes et al. | |
| 4,975,194 A | 12/1990 | Fuchs et al. | |
| 4,983,298 A | 1/1991 | Fuchs et al. | |
| 5,587,081 A | 12/1996 | Norcross et al. | |
| 5,906,750 A * | 5/1999 | Haase | 210/727 |
| 5,948,261 A | 9/1999 | Pressley | |
| 6,068,047 A | 5/2000 | Buchhave | |
| 6,203,701 B1 | 3/2001 | Pressley et al. | |
| 6,325,935 B1 | 12/2001 | Hojsgaard | |
| 6,454,944 B1 * | 9/2002 | Raven | 210/603 |

* cited by examiner

Primary Examiner—Chester T. Barry
(74) Attorney, Agent, or Firm—McQuaide, Blasko, Fleming & Faulkner, Inc.

(57) ABSTRACT

A continuous flow multistage aerobic wastewater sludge digestion system comprising at least two stages connected in series, each stage comprising one or more covered tanks, tank segments or compartments, each having an enclosed separate gas headspace, wherein the gas headspaces of each stage are connected in a specified sequence that may be identical to or different from the staging sequence followed by the sludge liquid. An oxygen containing gas stream, such as air or an oxygen enriched gas stream, is supplied to the headspace of each stage, and a means for aerating the sludge in one or more of the tanks, tank segments or compartments is provided to enhance the transfer of oxygen from the gas headspace into the sludge liquid for use by bacteria in digestion of the sludge. At least one stage of the sludge digestion system is operated at a thermophilic temperature above 50° C. and the flow of oxygen containing gas through the system can be cocurrent, countercurrent, or a mixture of both with respect to the flow of the liquid.

29 Claims, 4 Drawing Sheets

CONTINUOUS MULTISTAGE THERMOPHILIC AEROBIC SLUDGE DIGESTION SYSTEM

FIELD OF THE INVENTION

The present invention relates generally to systems for aerobic digestion, pasteurization and stabilization of wastewater sludges. More particularly, the invention relates to a continuous multistage, autothermal thermophilic aerobic digestion (ATAD) system for digesting, stabilizing and pasteurizing wastewater sludges as well as achieving significant reduction in the quantity of sludge requiring disposal.

BACKGROUND OF THE INVENTION

The need for human wastewater collection and treatment has been recognized for centuries. Initially, this need was driven by the desire to reduce disease caused by humans living in close proximity to their waste, but more recently wastewater treatment methods have evolved with a desire to reduce or eliminate water pollution and achieve desired levels of water quality. In the United States in the 1800s, the first major evolution of wastewater disposal began when pit privies and open drainage ditches were replaced by buried sewers that transmitted wastes and stormwater to other locations where it would have less effect on the community. The sewered population rapidly increased from about 1 million in 1860 to about 25 million in 1947 reflecting public awareness of the link between human disease and waste disposal practices.

Once large quantities of wastewater began being collected by sewers, it became possible to develop treatment processes to reduce or eliminate the harmful effects of sewerage on human health and the environment. The first treatment methods were basically anaerobic processes where collected sewage was allowed to digest and stabilize essentially undisturbed. However, near the end of the 1800s several researchers, with the idea that aerobic treatment would avoid malodorous anaerobic conditions and undesirable results, began to explore blowing air into sewage tanks. Over the course of the next three decades, experiments in aerobic treatment of sewerage led to the conclusion that aerating wastewater in the presence of a suspended biomass (achieved through solids recycle) was a very effective method of treating wastewater to degrade the biological constituents in the wastewater. In 1914 this process was coined the "activated sludge process" and has since become the standard method for secondary wastewater treatment.

The activated sludge process is a biochemical type of reaction. It involves the mass transfer of oxygen from an oxygen containing gas into the wastewater and then the mixing and use of that dissolved oxygen to support the growth of aerobic microorganisms suspended in the wastewater. These microorganisms, known as the biomass, oxidize the organic materials in the wastewater in different ways to eliminate the biochemical oxygen demand of the wastewater. FIG. 1 depicts a simple schematic diagram of a typical, flow-through, modern activated sludge process for "secondary" wastewater treatment. Effluent from "primary" treatment which typically involves just grinding and settling in a primary clarifier is the influent 15 to secondary treatment. The primary effluent 15 and recycle biological solids 16 (activated sludge) are first combined as the influent and are mixed and aerated in a biochemical reactor 17. Oxygen necessary for the process is provided by air or oxygen enriched gas 20 and aeration is usually hastened by use of gas-liquid contacting devices such as diffusers, surface aerators, and sparging mixing impellers (not shown). Usually the process operates in a continuous-flow mode, but can also be operated as a batch process. Contents of the reactor, referred to as mixed liquor, consist of wastewater, microorganisms (living and dead), and inert, biodegradable, and non-biodegradable suspended and colloidal matter. The particulate solid fraction of the mixed liquor is termed mixed liquor suspended solids (MLSS).

After a sufficient residence time for the biological reactions to occur, the mixed liquor is typically transferred to a separate settling basin 18 (clarifier) to allow gravity separation of the MLSS from the treated wastewater. Settled MLSS is then recycled to the aeration/reactor basin as recycled sludge 16 to maintain a sufficiently concentrated microbial population for rapid degradation of the influent wastewater constituents. Because there is usually a significant net positive production of biological MLSS (the rate of cell synthesis exceeds the rate of cell destruction) an increasing inventory of sludge builds up in the system and the excess activated sludge 19 must be discarded or "wasted" from the process continuously or periodically. Wasting typically is from the secondary gravity clarifier or sludge recycle stream, but direct removal from the aeration basin or reactor is also an alternative. The final result of the activated sludge process is two separate streams: the treated effluent wastewater 20 and the excess waste activated sludge stream 19. The effluent is a liquid/water stream very low in solids content and soluble pollutants that is sometimes treated to further improve its water quality prior to discharging it back into the environment. Further treatment options for the activated sludge treated wastewater effluent include nutrient removal processes and sterilization through ozonation or by UV radiation.

The waste activated sludge stream from the secondary wastewater treatment process is relatively high (compared to influent wastewater) in solids content (e.g. 1–3 wt % total solids) and is also typically further treated. The waste activated sludge is often combined with sludge from a primary clarifier operating in front of the activated sludge process. It is highly desirable to process this waste sludge in such a manner that it can be readily and economically disposed of without creating further pollution of the ecosphere. Further wastewater sludge treatment usually leads to either a concentrated liquid that can be land applied as a soil reconditioner, a stabilized solid biomass that is landfilled, or a pasteurized biosolid that can be beneficially used in some manner such as for a fertilizer or as a composting material.

The basic aim of all wastewater sludge treatment processes is to economically and efficiently reduce and stabilize waste sludge solids. In addition, the sludge treatment system should desirably also produce an end product which is fully suitable for final disposal without further physical or chemical treatment. In conventional practice final sludge disposal is commonly carried out by incineration, land filling or land spreading. In many instances, land disposal is employed and is particularly attractive due to minimal long-term environmental effects and is highly advantageous in contributing to reconditioning of the soil. However, the use of land spreading as a final sludge disposal method requires a well stabilized and pasteurized end product, so that the concentration of pathogenic organisms in the sludge is sufficiently low to avoid a potential health hazard in disposal of the sludge and the sludge is adequately stabilized to prevent further degradation in the environment.

Traditionally, three distinct processes have been widely utilized for treating wastewater sludge: oxidation ponds, anaerobic digestion and aerobic digestion. Oxidation ponds are generally employed in the form of comparatively shallow excavated earthen basins which extend over a large area of land and retain wastewater prior to its final disposal. Such ponds permit the biological oxidation of organic material by natural or artificially accelerated transfer of oxygen to the pond water from the ambient air. During the bio-oxidation process, the solids in the wastewater are biologically degraded to some extent and ultimately settle to the bottom of the pond, where they may become anaerobic and are further stabilized. Periodically the pond must be drained and the settled sludge dredged out to renew the volumetric capacity of the pond for further wastewater sludge treatment, and the withdrawn sludge is utilized for example as landfill. Oxidation ponds thus represent a functionally simple system for wastewater sludge treatment. The use of oxidation ponds, however, has limited utility, since their operation requires sizable land areas. Moreover, no significant reduction of the level of pathogens in the sludge is accomplished by this elementary treatment and disposal method.

Anaerobic digestion has generally been the most extensively used wastewater sludge digestion process for stabilizing concentrated organic solids, such as are removed from settling tanks, biological filters and activated sludge plants as discussed above. In common practice, the excess waste sludge is accumulated in large covered digesters where the sludge is mixed and naturally fermented anaerobically for about 30 days. The major reasons for widespread commercial use of anaerobic sludge digestion are that this method is: (1) capable of stabilizing large volumes of dilute organic slurries, (2) results in significant biological solids (biomass) reduction and stabilization, (3) produces a relatively easily dewaterable sludge, (4) a net producer of methane gas, and (5) potentially capable of producing a pasteurized sludge under the right conditions. Anaerobic digestion is characteristically carried out in large scale tanks which are more or less thoroughly mixed, either by mechanical means or by the recirculation of compressed digester gas. Such mixing rapidly increases the rate of the sludge stabilization reactions by creating a large zone of active decomposition.

Methane gas is produced during anaerobic digestion and is characteristically used in combustion heaters to offset heat losses of the anaerobic digestion process which usually operates at above ambient temperatures. However, seasonal temperature variations and fluctuations in the suspended solids level of the influent wastewater sludge have a significant effect on both the rate of methane gas production and the amount of heating which is necessary to maintain the digestion zone at the desired elevated temperature operating level. As a result, if elevated temperature conditions are to be maintained year round in the anaerobic digestion zone, an auxiliary heating system is generally an essential element of the overall sludge digestion system.

Since the rates of anaerobic digestion and resultant methane gas formation are strongly influenced by the suspended solids content of the sludge undergoing treatment and by the temperature level in the digestion zone, it is in general desirable to feed as concentrated a sludge as possible to the digester, thereby minimizing heat losses in the effluent stabilized sludge stream discharged from the anaerobic digester while maximizing methane production in the digester. However, even with such provisions elevated temperatures are difficult to maintain economically in the anaerobic digestion zone, especially during winter months. Furthermore, even comparatively small temperature fluctuations in the anaerobic digestion zone may result in disproportionately severe process upsetting and souring of the digester contents, as is well known. Perhaps the most important disadvantage of anaerobic sludge digestion systems is the requirement for large residence times of about 30 days that are needed to achieve adequate stabilization. These large residence times result in very large tank needs and correspondingly large capital costs for tank construction and mixing.

As an alternative to the foregoing anaerobic methods, biodegradable wastewater sludge can be digested aerobically. Air and to a much lesser extent high purity oxygen has commonly been employed in practice as the source of oxygen for this purpose. It is well known that aerobic digestion proceeds more rapidly at elevated temperatures. As temperature rises above 40° C., the population of mesophilic microorganisms declines and thermophilic forms increase. The temperature range of about 50–70° C. is often referred to as the thermophilic range where thermophilic bacteria predominate and where most mesophils are extinct. Above this range, the thermophils decline, and at 90° C., the system becomes essentially sterile. Because of the more rapid oxidation of sludge biomass at higher temperatures, thermophilic digestion achieves more complete removal of biodegradable volatile suspended solids (BVSS) than the same period of digestion at lower temperatures. A more stable residue is obtained which can be disposed of without nuisance. Thermophilic digestion can also effectively reduce or eliminate pathogenic bacteria in the sludge (pasteurize the sludge), thereby avoiding the potential health hazard associated with its disposal.

When air systems are used to supply dissolved oxygen for aerobic sludge digestion systems, with the air being passed through the body of sludge liquid in a digestion tank and freely vented to the atmosphere, the loss of heat from the sludge to the air being passed through the digester tends to become substantial in magnitude. This loss of heat is due in part to the sensible gas temperature heat loss of the hot gas being discharged into the atmosphere, but more importantly due to the evaporative heat loss of the gas caused by the evaporation of substantial quantities of water into the gas phase during the oxygen dissolution process. The air being contacted with the higher temperature sludge biomass will quickly come to the temperature of the sludge biomass being aerated and will also rapidly evaporate enough water into the gas phase to quickly bring the water content of the gas phase into gas-liquid equilibrium with the sludge liquid from the standpoint of the water vapor content of the aeration gas. As a result, aerobic digestion in the past has often involved digestion with only mesophilic microorganisms. However, more recently air sludge digestion systems operating in the thermophilic temperature range have become more common by employing such techniques as covered and highly insulated tanks, external heat sources and heat exchange equipment to minimize both the gas phase and liquid phase heat losses from the aerobic digester contents. Air contains only 21% oxygen and only about 10–20% of the oxygen content thereof is dissolved and available to the bacteria in the aerobic sludge digestion system. Accordingly, a very large quantity of air must be used to supply the oxygen requirements of the process and the heat losses from the digester associated with venting the sensible heat of the "spent" air and the latent heat required to saturate the spent air with water vapor are substantial. As a result of these heat losses in conventional air aerobic sludge digestion systems, very large quantities of external heat and/or extensive heat transfer equipment must be employed to sustain the sludge temperatures at the elevated thermophilic levels.

Several strategies have been employed to avoid the need for the addition of external heat into thermophilic aerobic sludge digestion systems. These methods are generally classified as autothermal aerobic digestion systems or "ATADs". The ATAD process is an aerobic digestion process that achieves thermophilic operating temperatures without external supplemental heat beyond that supplied by the aeration and mixing energy. Within the ATAD bioreactor, sufficient levels of dissolved oxygen, volatile solids, and mixing allow aerobic microorganisms to degrade organics to carbon dioxide, water, and nitrogen byproducts, during which significant heat energy is released and absorbed into the liquid phase. If sufficient insulation, residence time, and adequate solids concentrations are provided, the process can be operated at thermophilic temperatures to achieve a high level of volatile solids destruction and pathogen reduction sufficient to meet U.S. EPA regulations for the 40 CFR Part 503 Class A designation.

Since the early 1980s the U.S. EPA has promoted the use of biosolids in agriculture and issuance of the 40 CFR 503 regulations in 1993 further encouraged the practice. These regulations require that any biosolids applied to land must meet certain pathogen and vector attraction reduction limits. For example, the Class A designation specified in the regulation requires that pathogen levels have been reduced to below detectable levels. The regulations provide for six alternatives for meeting the pathogen reduction requirements. As an example, one alternative is to ensure that all particles are processed for a time determined by the following equation: $D=50,070,000/10^{0.14t}$ which applies when total solids are <7%; t is $\geq 50°$ C.; and D is residence time which is $\geq 30$ minutes. The second requirement of the regulations is related to stabilization or vector attraction reduction. The regulations give at least 10 options for meeting vector attraction reduction. One example is a 38% reduction in the volatile solids component of the sludge.

Air ATADs have been known for about two to three decades. FIG. 2 shows a schematic for a conventional type of Air ATAD system. Liquid feed sludge 22 is first thickened in a thickener 23 to at least about 3% solids before entering one or more of the ATAD reactors 24. The reactors are typically enclosed and insulated. They also include mixing, aeration, 25 and foam suppression equipment and are operated in batch mode with a sludge retention time of from about 5–10 days. These ATADs typically operate with two tanks or bioreactors in series but are not operated in a continuous flow manner. Some stabilization and heating occur in the first tank, with further stabilization and heating to temperatures of about 55° C. to 65° C. occurring in the second tank. Feeding is often intermittent, with removal of digested solids from the second tank, transfer of digesting solids from the first to the second tank, and addition of feed solids to the first tank. This promotes temperature elevation and minimizes short-circuiting of feed solids to the stabilized solids, thereby enhancing pathogen destruction. Liquid exits to a storage or cooling tank 26 before being further processed and/or land applied. The exit gas (offgas) 27 is vented or further treated such as by scrubbing. Benefits of ATAD include a high disinfection capability, relatively low space and tankage requirements, and a high sludge treatment rate. It is an effective and environmentally responsible means of achieving aerobic stabilization and producing sludge that meets the current regulations for Class A sludge pathogen control and for disposal of agricultural, municipal and industrial wastewater sludge on land and underground.

Single tank ATAD systems are also known that operate with a feeding technique called a partial fill and draw process where for example on a daily basis partial withdrawal from the reactor of about 1 days volume of sludge will occur for about 1 hour, then new feed will fill the tank back up followed by batch reacting for the remainder of the 24 hour cycle. This method limits the temperature swing of the system, but requires higher tank volumes. Digested sludge withdrawn from an ATAD can be further processed using conventional techniques such as dewatering prior to final disposal.

It is also known that heat losses in aerobic sludge digestion systems can be reduced by using oxygen-enriched or high purity oxygen gas rather than air. If a high utilization of the high purity oxygen gas can be achieved, the total amount of gas which must be fed to and vented from the aerobic digester is considerably smaller compared to air, because most if not all of the inert nitrogen gas has been removed. Heat losses due to sensible warmup and to water evaporation into the high purity oxygen gas stream are also significantly decreased. These reductions in heat losses are sufficient for autothermal heat alone to sustain the temperature at levels appreciably higher than ambient, so that the digestion zone is able to operate efficiently in the thermophilic temperature regime with no input of external heat to the process. Since thermophilic stabilization is much more rapid than mesophilic stabilization, the necessary residence time to achieve adequate stabilization in the aerobic digestion zone is also greatly reduced in the thermophilic mode. This in turn permits the use of smaller reactors which further reduces heat losses to the surroundings. Because of the faster rate of oxidation of sludge, oxygen ATAD can achieve suitably high biodegradable volatile solids reduction, in comparatively short sludge retention periods.

Despite their significant attractive features, ATAD systems have several associated disadvantages relative to anaerobic sludge digestion. First, since the thermophilic aerobic digestion process is oxidative in character, the process produces a bio-oxidation reaction product gas containing carbon dioxide and water vapor which have no end use utility and are directly vented to the atmosphere or scrubbed. By contrast, anaerobic digestion produces methane gas as a reaction by-product which may be exported from the treatment facility and is also useful as a fuel gas for satisfying the heating energy requirements associated with digestion at elevated temperatures. In addition, the aerobic digestion zone requires a much greater energy expenditure, for mixing and gas-sludge contacting, than is required in the anaerobic digestion system for mixing of the digester contents.

Many United States patents have been issued for improved aerobic sludge treatment processes operating in the thermophilic temperature range. Some representative examples include: U.S. Pat. No. 3,745,113 to Fuchs, U.S. Pat. No. 4,246,099 to Gould et al., U.S. Pat. No. 4,277,342 to Hayes et al., U.S. Pat. Nos. 4,975,194 and 4,983,298 to Fuchs et al., U.S. Pat. No. 5,587,081 to Norcross et al., U.S. Pat. No. 5,948,261 to Pressley, U.S. Pat. No. 6,068,047 to Buchhave, U.S. Pat. No. 6,203,701 to Pressley et al., and U.S. Pat. No. 6,325,935 to Hojsgaard. Several of these processes employ autothermal thermophilic aerobic digestion, or "ATAD", technology to treat the sludge biomass.

While existing aerobic sludge digestion systems provide viable sludge utilization and disposal alternatives, they also have a number of limitations. Most notably, many systems are not a reliable and predictable means of producing a pasteurized (Class A) sludge that has beneficial environmental uses. Moreover, operational difficulties exist with some conventional ATADs, particularly because they are mechanically more complex, require larger tanks, require expensive heat transfer equipment, and/or are subject to severe foaming.

Over the years, many solutions have been proposed for improving the disposal of wastewater sludge and overcoming the limitations of ATAD. As evidenced by the variety of patents mentioned above, there continues to be a need for further improved designs. Thus, while much effort has been spent in development of improvements in sludge treatment technology as well as in refinement of existing sludge treatment processes, there still exists a great need for better and more efficient and effective sludge treatment and disposal systems. There is especially a need for an efficient, aerobic sludge treatment system that is capable of producing a Class A pasteurized sludge at lower operating and capital costs. These are the primary needs addressed by the present invention.

Accordingly, it is an object of the present invention to provide an improved process for aerobic thermophilic digestion of wastewater sludge.

It is also an object of the invention to provide an efficient multistage aerobic sludge digestion system that is operated in a simple to operate and reliable performance continuous flow manner.

It is also an object of the present invention to provide an aerobic sludge digestion system with improved efficiency and lower operating costs and/or lower capital costs compared to current systems.

It is a further object of the invention to provide an aerobic sludge digestion system that can destroy pathogenic organisms and organic matter within wastewater treatment sludge so as to reliably produce a Class A pasteurized and adequately stabilized sludge.

It is a further object of the invention to provide an aerobic sludge digestion system that can be operated autothermally in the thermophilic temperature range at significantly lower capital and energy costs without the need for external heat sources or heat exchangers.

It is another object of the invention to provide an efficient multistage thermophilic aerobic sludge digestion system that can be integrated in front of an existing anaerobic sludge digestion process.

It is another object of the invention to provide an aerobic thermophilic sludge digestion process employing aerobic digestion and anaerobic digestion at elevated temperature, in a manner which utilizes the advantages of each while minimizing their attendant disadvantages.

It is a further object of the invention to provide a multistage sludge digestion system with the ability to specifically select the gas to liquid contacting staging order to optimize the overall performance of the entire system.

Other objects and advantages of this invention will be apparent from the ensuing disclosure and appended claims.

SUMMARY OF THE INVENTION

The subject invention is a continuous, multistage, aerobic wastewater sludge digestion, pasteurization, and stabilization system, comprising: (1) at least two stages connected in series, each stage comprising one or more covered tanks, tank segments or compartments, each having an enclosed separate gas headspace, (2) wherein the gas headspaces of each stage are connected in a specified sequence that may be identical to or different from the staging sequence followed by the sludge liquid, (3) an oxygen containing gas, such as air or an oxygen enriched gas stream, fed to the gas headspace of one or more of the tanks, tank segments or compartments, and (4) surface aerators for aerating and mixing the sludge liquid in the tanks, tank segments or compartments to enhance transfer of oxygen into the sludge liquid biomass for use by the bacteria in sludge digestion and stabilization. According to the invention, at least one stage of the aerobic sludge digestion system is operated in the thermophilic temperature range.

DETAILED DESCRIPTION OF THE INVENTION

The invention is a continuous flow system for the autothermal, thermophilic, aerobic digestion of municipal and/or industrial wastewater sludge and is referred to herein as a "continuous multistage autothermophilic aerobic digester" or "continuous multistage ATAD". Essentially, the system produces a pasteurized and stabilized sludge referred to as a "Class A" sludge by EPA regulation 40 CFR 503. The system and process of the invention comprises: (1) at least two continuously operated stages (at least three in some embodiments) connected in series, said stages employing one or more covered tanks or tank segments and containing liquid sludge which enters the system at the first liquid stage and exits at the last liquid stage; (2) each stage having an enclosed separate gas headspace defined by the space above the desired sludge liquid level, wherein the gas headspaces of each stage are interconnected in a specified sequence that is identical to or different from the staging sequence followed by the liquid; (3) an oxygen containing feed gas supplied to the gas headspace of one or more of the tanks or tank segments as one or more feed streams and flowing through at least one tank or tank segment and exiting at one or more exit streams; and (4) means for providing vigorous gas-liquid contact and sludge liquid mixing in one or more of the tanks or tank segments or compartments to enhance transfer of oxygen into the sludge liquid for use by the bacteria in sludge digestion.

The sludge feed stream to the continuous multistage aerobic digester of the present invention can be practically any industrial or municipal wastewater sludge stream containing greater than about two percent total suspended solids (TSS). Generally, the sludge being treated is produced by an activated sludge plant and constitutes either primary sludge, secondary sludge or a combination of both. In such a plant, the primary and secondary sludges are often combined and after being combined, are pumped, or otherwise transported, to a thickening station for concentrating the biomass to a higher solids concentration. The thickening station may comprise, for example, a horizontal solid bowl-decanting centrifuge, gravity belt filter, dissolved air flotation, gravity settling, evaporative heat treatment, or mechanical drum thickener that is capable of removing water from the sludge and increasing the TSS content to at least about 3 wt % and usually to about 4–5 wt % TSS.

Figure 3A:
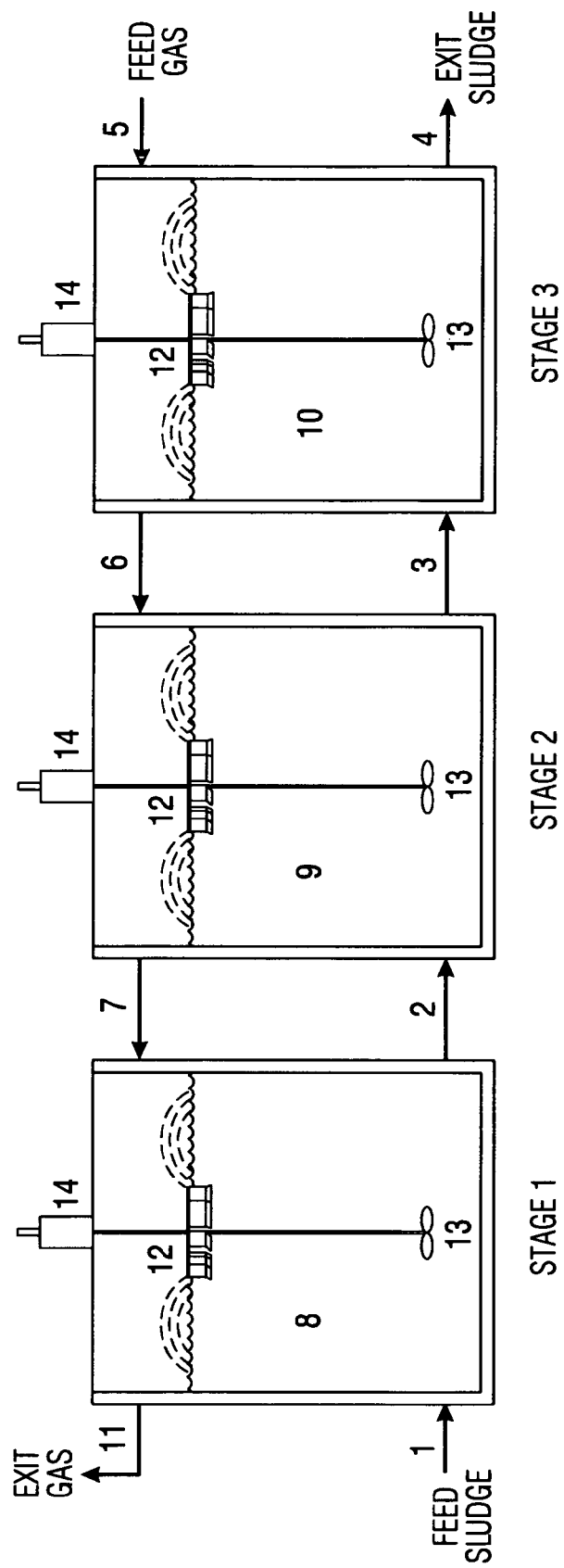
FIGS. 3A and 3B show diagrams illustrating two embodiments of the continuous multistage aerobic sludge digestion system of the present invention.
Figure 3B:
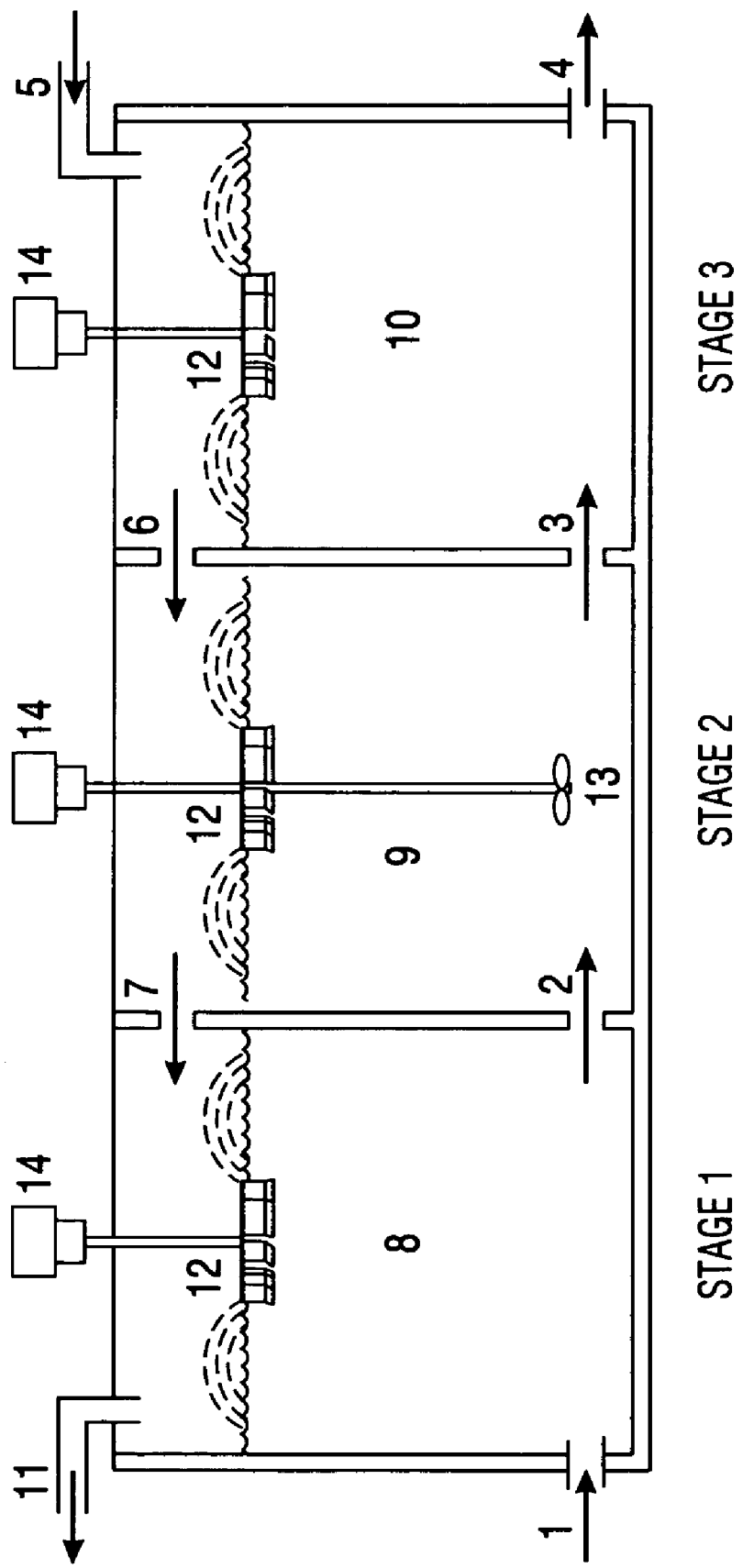

From the thickening station, the sludge is then pumped to an optional holding tank (useful to achieve flow equalization) or directly into the first stage of the continuous flow multistage aerobic sludge digestion system via a feed line or similar piping apparatus represented as inflow 1 in the schematic diagram of FIG. 3. Depending upon the specific circumstances such as: (1) the total volume of sludge to be treated, (2) existing plant facilities, and (3) costs, the multiple stages of the invention can be separate tanks, common wall tanks, or a segmented or compartmentalized single tank. Additionally, the materials of construction are not critical with steel and fiberglass cylindrical and concrete common wall rectangular tanks being the typical choices. One of the most important features of the reactors, whatever their construction, is that they have individual and enclosed gas headspaces for each stage. Separate headspaces allow each reactor to have its own gas stage and permits gas staging to increase the performance and/or efficiency of the overall multistage system. This is a key feature of the invention not recognized by the prior art.

As is known to those skilled in the art, flow control valves could, if necessary, be operatively connected to the respective tanks to control the flow of sludge to and from the tanks. If desired, a controller may be used to operate the flow control valves in a preselected and timed sequence. However, in a preferred embodiment of the invention, the stages will be rectangular in cross section with common wall construction between as many stages as possible to eliminate the need for multistage control valves. Each tank or stage must be properly insulated to provide efficient conservation of heat. Examples of suitable insulation materials include polyurethane foam and polystyrene at thicknesses of from about 3 cm to 10 cm and other materials and methods known to those in the industry. Each of the reactors may also contain common sensors for record keeping or control purposes including liquid temperature and dissolved oxygen sensors.

Each tank or stage also includes at least one opening for allowing oxygen containing gas to be introduced from outside the tank to the gas space or "headspace" thereof, defined as the enclosed region of the tank above the surface of the sludge liquid. At least one stage is connected to one or more gas blowers which blow air, oxygen enriched air, substantially pure oxygen or other oxygen containing gas into the stage gas headspace. In the case of physically separate liquid stage reactors, gas distribution pipes are used to interconnect the gas headspaces of each tank. In the case of common walled tanks or segmented tanks, the gas flow between stages can simply be provided by suitable openings in the headspace area of the common walls between stages. Additionally, air flow meters and/or oxygen gas analyzers may be employed at various points throughout the multistage system.

The number and size of the reactors or stages of the invention can be adjusted in accordance with desired operating conditions and feed sludge characteristics. Increasing the size or volume of a particular reactor or stage has two primary effects: it increases the sludge residence time of that particular stage and increases the residence time of the overall sludge digestion system. Residence time is an important design criteria and can affect the multistage temperature profile and the overall total solids digestion in the system. Total sludge residence times of from 2–6 (typically 3–6) days are typical of the aerobic systems of the present invention. Even shorter residence times (approximately 1–3, preferably less than 2.5 days) will be typical with embodiments of the invention comprising both aerobic and anaerobic treatment systems.

The total number of stages in the continuous multistage thermophilic aerobic digestion system can vary widely. A minimum of two aerobic stages is required when the last stage of the system is a thermophilic stage or when the aerobic system is a precursor to an anaerobic digester. A minimum of three aerobic stages is required when the last stage is operating in the mesophilic temperature range. For purposes of this invention, thermophilic temperatures are in the range of about 50–70° C. and mesophilic temperatures are in the range of about 30–50° C. The number of stages is typically from 3–10, often from 4–9 and in at least one embodiment of the invention is preferably at least 5. The multiple continuous stages of the invention provide significantly improved performance over the prior art by increasing the overall volumetric efficiency of the sludge digestion process and greatly reducing the gas phase heat loss from the system.

The oxygen containing gas of the invention preferably contains greater than 20 percent by volume oxygen. The oxygen containing gas can be air, oxygen enriched gas or high purity oxygen. As defined herein, "high purity" means an oxygen containing gas having an oxygen concentration greater than about 80% pure oxygen by volume, more preferably greater than about 90% pure oxygen by volume, and most preferably greater than about 95% pure oxygen by volume. In some embodiments of the invention, the use of high purity oxygen is preferred to enhance the rate of oxygen dissolution into the sludge and thereby promote the rate of autothermal heating thereof. This is particularly the case when the sludge has a low biodegradable volatile solids (BVSS) content which is typically the case with sludge of less than about 3 wt % TSS or less than about 1.5 wt % BVSS since BVSS is often around one-half of the TSS content in municipal wastewater sludge. Sludge of about 2 wt % TSS and about 1% BVSS is considered very low in BVSS content. However, as will be more fully discussed in the examples below, air is the preferred gas in other embodiments of the invention.

It is particularly important to note that the flow of oxygen containing gas through the multistage system, the "gas staging", is a critical design variable that can vary from one embodiment to another. In addition to the options of being completely cocurrent or completely countercurrent, the flow of gas may also be partially cocurrent and/or partially countercurrent relative to the flow of the liquid sludge. The ability to specifically provide the optimal gas staging in order to optimize the overall performance of the entire multistage system is a key operational feature that distinguishes our system over prior art processes. In one embodiment the order of gas staging is determined by that which minimizes overall electrical power requirements to produce Class A sludge. In another embodiment, the order of gas staging is determined by that which maximizes BVSS reduction. In yet another embodiment, gas is introduced into the system at a stage other than the initial or final sludge stages such that gas enters the highest temperature stage and exits the lowest temperature stage. In a preferred embodiment using air as the feed gas, the number of stages is at least five, the gas flows countercurrent to the liquid, the last sludge stage is mesophilic, and the system has at least two thermophilic stages. In yet a further preferred embodiment the first sludge stage is also operated in the mesophilic temperature range. Additionally, it is an option of the present invention to employ multiple gas feed streams into separate stages. For example, a separate air feed stream may be provided in one or more of the final stages to increase the evaporative cooling effect of the gas flow.

The supply or feeding of the oxygen containing gas to the multistage gas-liquid contacting system in the case of air aeration is quite simply accomplished by a low pressure air blower since the gas headspaces in the entire system will be only a few inches of water pressure above the ambient atmospheric pressure. The flow of gas between successive gas stage headspaces following the feed gas stage headspace supplied by the above blower is accomplished through appropriate sized openings in the common walls between successive stages or by suitable conduit means if the stages are in totally separate physical containers. The power requirement of the low pressure air feed gas blower is relatively small since the entire system operates only slightly above the ambient atmospheric pressure and the gas phase pressure and the gas phase pressure drop between successive gas headspaces will be extremely small. If the system uses a high purity oxygen feed gas as opposed to atmospheric air then the gas flow from the high purity oxygen generator will be directly connected to the feed gas stage as outlined above for the case of air aeration. Sources of high purity oxygen for the present invention include all sources known to those skilled in the art and include: liquid oxygen tanks, on site pressure swing adsorption devices, vacuum swing adsorption facilities, and cryogenic production facilities.

Figure 1:
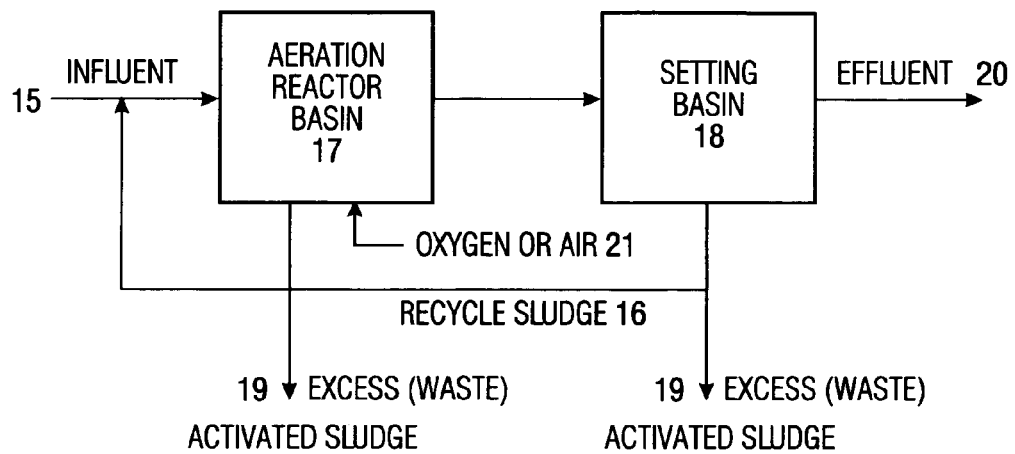
FIG. 1 depicts a schematic of a typical, flow-through, modern activated sludge system.
Figure 2:
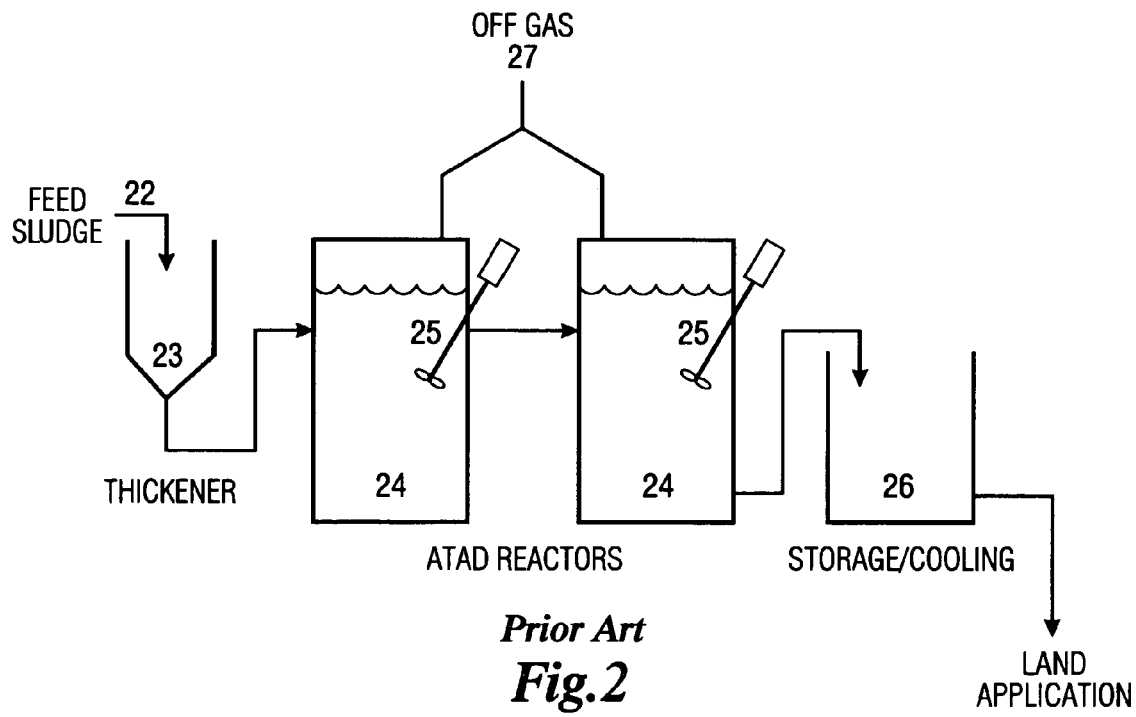
FIG. 2 shows a schematic for a conventional type of air autothermal aerobic sludge digestion system (ATAD).

It is a principal aspect of the present invention that an efficient gas-liquid contacting and sludge mixing device is contained in each aerobic stage. Different types of gas-liquid contacting devices are well known to those skilled in the art and a specific gas-liquid contacting device design is not a requirement of the invention. Some well known gas-liquid contacting devices include diffusers, surface aerators, submerged gas-liquid turbines, and jet aerators. The preferred means of providing the gas-liquid contacting and mixing within each stage is by the use of surface aerators to effect the sludge circulation and mixing necessary for efficient transfer of the oxygen containing gas into the sludge liquid. In practice, it is preferable that the aerating means employed be capable of achieving high oxygen transfer energy efficiency and high mixing capability. U.S. Pat. No. 6,715,912 to J. McWhirter, et al. (hereby incorporated by reference) discloses such preferred surface aerator designs. As shown in FIG. 1 of that patent, the impeller is rotated on a vertical shaft mounted in a tank and is connected to a power source and gear reduction means. The impeller has a plurality of blades mounted on the underside of a disc or disc-like surface. Each blade has a multi-faceted or curved geometry ranging from vertical at the point of attachment to the disc to partially inclined at the bottom. The blades are spaced circumferentially about the axis and are disposed radially or at acute angles to radial lines from the axis of rotation of the impeller. The lower portions of the blades, which are less inclined or less vertical than the upper portions, are positioned below the static liquid surface.

When the impeller is rotated, the lower portion of the impeller blade pumps the sludge up onto the vertical portion of the blades where the sludge is discharged into a spray umbrella in a direction upwardly from the static liquid surface and outwardly away from the rotating impeller. In this manner, the impeller is able to transfer a high amount of oxygen containing gas into the sludge while thoroughly mixing the entire body of sludge in the tank. In addition to, or alternatively, in lieu of surface aeration impellers as described above, the aerating means in one or more of said tanks, tank segments or compartments comprises submerged mixing turbines for facilitating the transfer of oxygen containing gas into the sludge.

In another embodiment of the invention, especially useful in smaller wastewater treatment plants, a single compartmented or segmented tank is used for the continuous multistage aerobic digestion system. In this case there is usually insufficient surface area in the tanks and/or tank compartments to permit effective use of surface aeration impellers. In such cases, high oxygen transfer efficiency and liquid pumping rates can be achieved through the use of a draft tube containing multiple axial flow impellers, as described in U.S. Pat. Nos. 5,972,661 and 6,464,384 to J. McWhirter, et al. (hereby incorporated by reference). A draft tube system with multiple axial flow impellers alone can be used to effect mixing and circulation of oxygen containing gas throughout the tanks and/or tank compartments, however, a multiple axial flow impeller system may also be used in conjunction with a surface aeration impeller to obtain high percentage oxygen absorption.

The invention will now be described with reference to FIGS. 3 and 4. FIG. 3 shows one embodiment of a continuous multistage ATAD according to the present invention having three stages and countercurrent gas flow. In FIG. 3, the incoming feed sludge stream 1 enters the first covered and insulated (not shown) stage 8 and flows continuously through the second stage 9 and onto the third stage 10 prior to exiting as digested sludge stream 4. The oxygen containing gas stream flows countercurrent to the sludge liquid and enters the system at the headspace of the third liquid stage as feed stream 5. The gas then flows continuously and sequentially through the headspaces of the second and first liquid stages before exiting the first liquid stage as exit gas stream 11. The exit gas may be vented to the atmosphere or further processed for odor control via means well-known to those skilled in the art. Gas-liquid contacting and mixing is enhanced by a surface aerator 12 and optional mixing impeller 13 in each stage.

Figure 4:
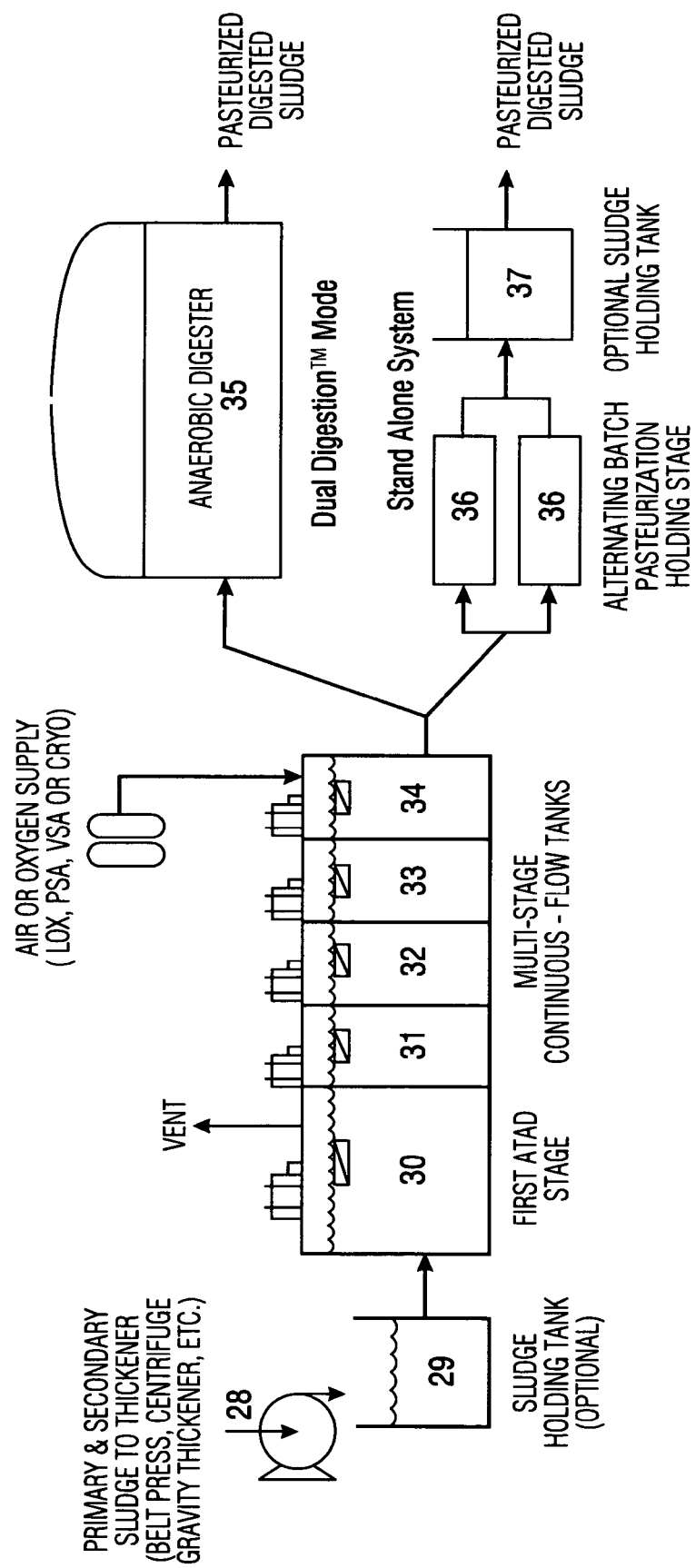
FIG. 4 shows a diagram of another embodiment of the present with optional anaerobic digester and optional alternating batch pasteurization tanks.

FIG. 4 shows another embodiment of the invention having five aerobic sludge digestion gas-liquid contacting stages. Wastewater sludge from primary and/or secondary treatment facilities is first fed into a thickening device 28 and then is sent to an optional holding tank 29. From the holding tank, the influent sludge is continuously sent to the first liquid stage 30 of the ATAD system. The liquid sludge then flows continuously through the remaining stages of the system 31, 32, 33, and 34. Air or oxygen enriched gas feed enters the gas headspace of the last liquid stage 34 and flows continuously through the remaining stages in a countercurrent flow manner. The oxygen containing gas exits the first liquid stage 30 where it can be vented, recycled, or scrubbed. Processed liquid sludge exiting the system from the last stage 34 is optionally sent to an anaerobic digester 35 or into alternating batch reactors 36 as previous discussed. An optional holding tank 37 is also shown. It is important to note that a major benefit of the present invention is the Dual Digestion version of the invention. By operating a continuous flow, multistage thermophilic aerobic sludge digestion system according to the invention prior to an existing anaerobic system the capacity of the anaerobic digester can be effectively at least doubled in addition to producing pasteurized sludge. Also, it is noted that this figure illustrates an embodiment of the invention that uses a large first liquid stage. As shown, the first stage is at least twice the size of the average of the other stages.

An important feature of the present continuous flow, multistage, thermophlic aerobic sludge digestion invention is its ability to simultaneously pasteurize and stabilize sludge. The EPA terms such digested sludge a "Class A" biosolid and specifies in 40 CFR Part 503 its requirements for achieving Class A status. The production of Class A biosolids is becoming more important due to the EPA's much less restrictive rules for the beneficial use of such sludge (e.g. fertilization) and the public's perception of increased safety of Class A sludge. The EPA Class A designation has stringent pathogen reduction and vector attraction reduction requirements. While the actual regulations are complex, one option for meeting the pasteurization requirement is to treat the sludge for a sufficient time at a high enough temperature as specified in the regulations. For example, according to the specified time-temperature requirements, it takes only about 5 hours to pasteurize liquid sludge maintained at about 60° C. However, we note that 40 CFR 503 does not specifically address continuous flow systems like the present invention. Hence we consider pasteurization to occur under conditions which give pathogen reduction in the continuous flow outlet stream that is equivalent to the specified batch requirement conditions.

The EPA vector attraction reduction requirements are also complex and have multiple options for achieving acceptable sludge stability. The simplest option for achieving sufficient vector attraction reduction is a reduction of volatile suspended solids content by 38% or more. We use this definition of stabilized sludge in the present application.

In the systems of the present invention, pasteurization can be obtained by one of three different methods. First, as stated above, sludge can have a sufficient average residence time in the entire multistage system at a sustained high enough temperature so that pathogen reduction equivalent to that which EPA regulations require for batch processes is ensured. Second, the continuous flow multistage digester can exit into alternating batch pasteurization tanks where the sludge is pasteurized in a batch tank for a time sufficient to meet the specific 40 CFR 503 time-temperature requirements. Two alternating batch pasteurization tanks are required to ensure that the overall system can remain continuous. While one batch pasteurization tank is filling up the other tank is pasteurizing and emptying and vice-versa. The batch pasteurization tanks can be mixed, but generally need not be aerated. The digested sludge exiting from the aerated reactors remains continuous because one or the other of alternating batch pasteurization tanks is always filling as a valve can simply switch the flow to the other tank after it finishes pasteurizing and emptying. The third option for pasteurization relates to the DUAL DIGESTION™ version of the invention where sludge exiting from the continuous multistage aerobic system of the invention flows directly or indirectly into an anaerobic digestion system. Sludge can have a sufficient residence time in the thermophlic aerobic sludge digestion system combined with an anaerobic digester to reach pasteurization according to the EPA regulations. The specific design of the anaerobic digestion system is not strictly a part of the present invention and any design known to those skilled in the art may be used.

The overall temperature profile of the multiple stages of the continuous flow, sludge digestion invention is an important feature of the system. By "profile" is meant that each stage has a unique temperature that is relatively constant throughout the stage and is relatively stable over time (given a stable input stream). The individual gas-liquid stages are essentially completely mixed in both the gas phase and the liquid phase and therefore have a constant and equal temperature in both phases as well as a constant composition in both phases. The series of temperatures for the stages is known as the system's overall temperature profile. For example, for a six stage system, a steadily increasing temperature profile might have the following temperatures in stages 1–6 respectively: 45-55-60-63-65-66° C. Likewise, an increasing temperature profile followed by a decreasing profile in the same multistage, continuous flow system might have the following temperatures in stages 1–6: 45-55-63-60-48-40° C. This temperature profile which might be termed as a "humped" profile having at least one mesophilic stage at the beginning and end of the system and 1, 2 or 3 intermediate thermophilic stages is a preferred embodiment of the invention, especially for those systems using countercurrent air flow. Alternatively, just the last one or two stages operates in the mesophilic temperature range. It is known that unpleasant odors exist in both the gas and liquid streams of aerobic sludge digestion systems operating only under thermophilic conditions. These unpleasant odors can be greatly reduced or eliminated by putting the exiting gas and sludge liquid streams through one or more stages operating in the mesophilic temperature range prior to exiting the multistage system.

The steadily increasing sludge temperature profile is often preferred when the last aerobic stage of the multistage system exits to alternating batch pasteurization tanks or to an anaerobic digester. Having a mesophilic last liquid stage (and preferably both first and last stages) is generally preferred over other designs. The last mesophilic stage can be provided by a number of means. First, with an air system, making the last sludge liquid stage the first or second gas contacting stage will typically cool the last liquid stage down to the mesophilic temperature range due to the substantial evaporative heat losses into the high flowing air stream. It is an important element of this invention, however, that most of the heat absorbed into the feed air stream in the later liquid stages is recovered via direct condensation into the incoming liquid sludge stream as the air stream exits a cooler stage, such as the first sludge liquid stage in the multistage system. This would be the case in a countercurrent air flow system. Second, a mesophilic last liquid stage can be provided by active cooling such as by the use of internal heat exchangers or cooling coils inside the tanks. However, this is a much more expensive option and is not preferred in the present invention. Finally, in a primarily high purity oxygen system the last one or two stages can be separately aerated with air to provide a cooling effect through evaporative heat losses. This may be especially useful in high purity oxygen systems since evaporative heat losses by using countercurrent high purity oxygen gas flow alone will be minimal because of the substantially lower total gas flow rates. It is also noted that one or more mesophilic stages may be operated after alternating batch pasteurization tanks as discussed above.

Although not shown in any figure, various control schemes may be employed to control the temperature and/or digestion rate of the sludge in any particular stage. One example is the use of variable frequency drives (VFDs) on the surface aerators. VFDs can be used to modulate the speed of rotation and hence the oxygen transfer rate into each tank and/or tank segment based on the rate of dissolution of oxygen containing gas into the sludge and/or the liquid phase temperature. In this way, oxygen transfer can be precisely controlled in accordance with a feedback control system. It will be understood that while specific tank, pump, piping and controller arrangements are described herein, it is foreseen that known systems for directing and controlling the flow of wastewater and sludge through various components of a wastewater treatment plant may be employed.

EXAMPLES

The invention will now be described and illustrated by the following examples. The examples were obtained by fundamentally rigorous mathematical modeling of the continuous flow, multistage aerobic sludge pasteurization and stabilization systems of the invention. The simulation program uses complete multistage mass and energy balances coupled with detailed multicomponent mass transfer and kinetic reaction calculations to accurately model a very broad range of design conditions and performance characteristics. Input variables include: number and size/dimensions of stages; feed sludge flow rate and temperature; feed sludge TSS, VSS, and BVSS concentrations; gas feed flow rate and composition, and gas flow staging order; and the performance parameters of the gas-liquid contacting units including SAE, alpha factor, beta factor, and optionally power input. The power inputs of the gas-liquid contacting units can be directly specified or the required power requirements are automatically determined to maintain positive dissolved oxygen levels in the individual stages.

each stage (which is solely determined by the volume of each stage) and gives an indication of the degree of pasteurization occurring in each stage. The pasteurization indicator level is the ratio of the residence time in that stage divided by the time required for pasteurization at that stage temperature according to the EPA's time-temperature relationship given in 40 CFR 503. A stage pasteurization ratio of less than 1.0 means that the residence time is more than sufficient for complete pasteurization at that stage residence time and the lower the ratio, the more pasteurization will be obtained. It is noted that the EPA's time-temperature relationships are not intended for continuous flow systems. However, given the ability of effectively designed multistage systems to closely approximate plug-flow or batch system residence time flow distribution characteristics, we believe a multistage system with a number of stages having a pasteurization ratio of less than 1.0 is a very good indicator of the high level of sludge pasteurization achieved by the present invention.

TABLE 1

Example 1 Model Simulation Performance Results

| Stage # | 1 | 2 | 3 | 4 | 5 | 6 | 7 | 8 | 9 | 10 |
|---|---|---|---|---|---|---|---|---|---|---|
| Sludge Stage Residence Time (days) | 0.20 | 0.38 | 0.38 | 0.38 | 0.38 | 0.38 | 0.56 | 0.73 | 0.38 | 0.38 |
| Stage Temp (° C.) | 26.0 | 50.2 | 63.5 | 67.2 | 67.6 | 66.9 | 65.6 | 62.6 | 56.3 | 46.0 |
| Aerator Shaft HP | 5.2 | 17.4 | 17.2 | 10.3 | 7.9 | 9.6 | 15.6 | 18.4 | 7.5 | 5.9 |
| Stage Pasteurization Ratio | — | 12.4 | 0.17 | 0.05 | 0.05 | 0.06 | 0.06 | 0.12 | 1.77 | 48.8 |

Example 1

Ten Stage System with Countercurrent Flow Air Aeration Gas

The total number of stages is 10 with an overall volume of 212,207 gallons which provided a total sludge residence time of 4.13 days. The input sludge stream had a flow rate of 51,430 gallons per day at a temperature of 12° C. The TSS content of the sludge was 2.5 wt %, the VSS/TSS ratio was 0.84 and the BVSS/VSS ratio was 0.55. The air feed rate corresponded to a total contained oxygen feed rate of 12 tons per day of oxygen gas and the gas staging flow was completely countercurrent relative to the liquid staging. The surface aerator gas-liquid contacting devices in each stage was assumed to have an SAE of 3.5, an alpha factor of 0.7, and a beta factor of 0.92.

The model simulation performance results showed a total system BVSS reduction of 63.1%, overall oxygen utilization efficiency of 20.9%, and total surface aerator shaft horsepower requirements of 115 HP. Additionally, the stages had a temperature profile and power input as given in the table below. The table also shows the sludge residence time in This example clearly shows that the continuous multistage air ATAD system according to the invention readily achieves high sludge thermophilic digestion temperatures, a high level of BVSS reduction and a high degree of sludge pasteurization as indicated by the pasteurization ratio being substantially less than 1.0 in 6 successive stages out of the total 9 stage system. It is noted that these results are achieved with a feed sludge having a very low BVSS content and at a very low sludge feed temperature which represents extremely challenging process design parameters.

Example 2

Nine Stage System with Countercurrent Flow Air Aeration Gas

This simulation is similar to Example 1 except that the air feed rate is reduced to 9 tons per day of contained oxygen gas and the sludge feed was thickened to 3.4 wt % TSS at a total flow rate of 37,816 gallons per day. Additionally, the total number of stages was reduced to 9 and the overall sludge residence time was increased to 5.12 days. Simulation results show a total system BVSS reduction of 67.2%, overall oxygen utilization efficiency of 22.2%, and total surface aerator shaft horsepower requirement of 166 HP as shown in the table below.

TABLE 2

Example 2 Model Simulation Performance Results

| Stage # | 1 | 2 | 3 | 4 | 5 | 6 | 7 | 8 | 9 |
|---|---|---|---|---|---|---|---|---|---|
| Sludge Stage Residence Time (days) | 0.51 | 0.51 | 0.51 | 0.51 | 0.51 | 0.51 | 0.77 | 0.77 | 0.51 |
| Stage Temp (° C.) | 55.0 | 67.1 | 68.7 | 68.5 | 67.6 | 66.0 | 63.1 | 57.0 | 45.0 |
| Aerator Shaft HP | 36.3 | 21.6 | 10.4 | 11.8 | 15.5 | 18.3 | 22.7 | 19.2 | 10.2 |
| Stage Pasteurization Ratio | 1.94 | 0.04 | 0.02 | 0.03 | 0.03 | 0.06 | 0.10 | 0.68 | 49.4 |

This example clearly shows excellent sludge pasteurization and high BVSS reduction. It also highlights a couple of important system performance characteristics compared with Example 1. First, reducing the air flow tends to increase the surface aerator horsepower requirements. Second, increasing the sludge residence time tends to increase the overall sludge digestion temperatures and increase the overall BVSS reduction.

Example 3

Nine Stage System with Countercurrent Flow Air Aeration Gas

This example was the same as Example 2 but illustrates how the inventive system handles a medium solids content sludge (3.5% TSS) at a very low residence time (2.33 days). This design achieves a total BVSS conversion of 47.7%, total surface aerator shaft horsepower requirement of 112 HP, and total oxygen utilization of 15.8%. Other results are as follows:

TABLE 3

Example 3 Model Simulation Performance Results

| Stage # | 1 | 2 | 3 | 4 | 5 | 6 | 7 | 8 | 9 |
|---|---|---|---|---|---|---|---|---|---|
| Sludge Stage Residence Time (days) | 0.26 | 0.26 | 0.26 | 0.26 | 0.26 | 0.26 | 0.26 | 0.26 | 0.26 |
| Stage Temp (° C.) | 46.0 | 62.8 | 66.3 | 65.9 | 64.3 | 61.7 | 57.8 | 51.9 | 41.5 |
| Aerator Shaft HP | 15.7 | 16.5 | 12.8 | 12.2 | 13.7 | 12.4 | 11.2 | 9.6 | 7.7 |
| Stage Pasteurization Ratio | 70.7 | 0.32 | 0.10 | 0.11 | 0.19 | 0.45 | 1.56 | 10.41 | — |

This example clearly shows exceptional pasteurization performance at a very low total sludge residence time. However, the low residence time is not sufficient to obtain a high degree of BVSS conversion and thus this design would not be particularly useful for producing a Class A sludge. However, this system design is well suited to provide a pasteurized feed into an anaerobic digester as it is generally preferred to minimize the amount of BVSS reduction that occurs prior to the anaerobic digester. Anaerobic digesters prefer high BVSS content sludge since the BVSS is the principle resource for methane production.

Example 4

Two Stage System with Countercurrent Flow Air Aeration Gas

In this two stage continuous flow air system design, the feed sludge has a temperature of 10° C. and a flow rate of 23,880 gallons per day at a TSS of 4.7 wt %, a VSS/TSS ratio of 0.80 and a BVSS/VSS ratio of 0.70. The feed air stream has a contained oxygen content of 8 tons per day. The total volume of the two stages was 55,636 gallons (10,473 gallons in the first stage and 45,164 gallons in the second stage) giving a total system residence time of 2.33 days. The surface aerator horsepowers were fixed at 15 HP in the first stage and 60 HP in the second stage. Simulation results show a total BVSS reduction of 44.2% and an oxygen utilization of 23.2%. Additional results are shown in the table below.

TABLE 4

Example 4 Model Simulation Performance Results

| Stage # | 1 | 2 |
|---|---|---|
| Sludge Stage Residence Time (days) | 0.44 | 1.89 |
| Stage Temp (° C.) | 46.3 | 60.8 |
| Aerator Shaft HP | 15.0 | 60.0 |
| Stage Pasteurization Ratio | 37.7 | 0.08 |

This example demonstrates the ability of the invention to produce a pasteurized sludge in only two stages and only 2.33 days of total residence time. The total system BVSS reduction is 44.2% so this design does not adequately stabilize the sludge for the Class A designation by itself, but the exit sludge would be very useful for the feed to a subsequent anaerobic digestion system.

Example 5

Six Stage System with High Purity Oxygen Aeration with Partial Cocurrent and Countercurrent Gas Flow The total number of stages in this design is 6 with an overall volume of 110,801 gallons which provides a total sludge residence time of 2.47 days. The input sludge stream has a flow rate of about 45,000 gallons per day at a temperature of 10° C. The TSS content of the sludge is 5.0 wt %, the VSS/TSS ratio is 0.80 and the BVSS/NVSS ratio is 0.60. The high purity oxygen (90% by volume $O_2$) feed rate corresponds to a total contained oxygen feed rate of 5 tons per day of oxygen gas. The high purity oxygen gas is fed into stage 3 and then flows into stages 4, 5, 6 and 2 in that order and exits from stage 1 and is thus partially cocurrent and partially countercurrent with respect to the sludge liquid flow. The surface aerator gas-liquid contacting devices in each stage have an SAE of 4, an alpha factor of 0.7, and a beta factor of 0.92.

This system design achieves a total BVSS reduction of 43.6%, an overall oxygen utilization efficiency of 62.8%, and requires a total surface aerator shaft horsepower of 39.8 HP. Additionally, the stages have a temperature profile and power input requirement as given in the table below.

TABLE 5

Example 5 Model Simulation Performance Results

| Stage # | 1 | 2 | 3 | 4 | 5 | 6 |
|---|---|---|---|---|---|---|
| Sludge Stage Residence Time (days) | 0.62 | 0.62 | 0.31 | 0.31 | 0.31 | 0.31 |
| Stage Temp (° C.) | 20.1 | 37.8 | 44.5 | 52.4 | 59.4 | 64.0 |
| Aerator Shaft HP | 10.9 | 12.8 | 3.6 | 4.2 | 4.5 | 3.8 |
| Stage Pasteurization Ratio | — | — | 96.8 | 7.45 | 0.79 | 0.18 |

This example demonstrates a continuous multistage high purity oxygen ATAD system having 6 stages according to the invention. This design would also be a good choice for producing a pasteurized sludge for feeding into an anaerobic digester as high temperatures are achieved in multiple stages and the BVSS reduction is not too high. This example also illustrates the usefulness of the invention for higher solids content sludges and also the usefulness of having larger first and/or second stages to more rapidly bring the sludge up to thermophilic temperatures. The advantage of a partially cocurrent and partially countercurrent gas flow staging is also demonstrated in this design.

Example 6

Three Stage System with High Purity Oxygen Aeration with Partial Cocurrent and Countercurrent Gas Flow This example provides another demonstration of a design suitable for use in a Dual Digestion™ system. This example uses 3 stages and high purity oxygen (90%) at a contained oxygen gas feed rate of 3 tons per day. The sludge feed has a temperature of 10° C. at a flow rate of about 45,000 gallons per day and the total system volume is 130,062 gallons. The gas feed order was 2, 3, 1 and the surface aerator performance parameters are the same as the previous example. The design results in a BVSS reduction of 49.7% and a total surface aerator horsepower of 80.5 HP with an oxygen utilization efficiency of 91.8%. Results are given in the table below.

TABLE 6

Example 6 Model Simulation Results

| Stage # | 1 | 2 | 3 |
|---|---|---|---|
| Sludge Stage Residence Time (days) | 0.97 | 0.97 | 0.97 |
| Stage Temp (° C.) | 29.3 | 46.5 | 60.8 |
| Aerator Shaft HP | 47.9 | 11.7 | 21.0 |
| Stage Pasteurization Ratio | — | 16.2 | 0.16 |

This example shows the potential of the present invention for pasteurization using only 3 stages and less than 3 days total system sludge residence time. It is noted that the total surface aerator power requirement is rather high, but this could be decreased easily by increasing the high purity oxygen feed rate and thus lowering the overall system oxygen utilization efficiency.

These examples dramatically demonstrate the enhanced performance of the present aerobic sludge digestion invention. The present invention is an effective and environmentally responsible means of achieving both sludge pasteurization and stabilization and producing digested sludge that meets the current regulations for disinfection and disposal of agricultural, municipal and industrial wastewater sludges on land and underground. The system is autothermally operated in the thermophilic temperature range that achieves aerobic stabilization of the sludge at considerably lower residence times. As a result, the invention significantly lowers both capital and operating costs. The system effectively separates wastewater sludge into low residual water and safely disposable organic matter, which allows the water to be recycled back into the environment (or reused) and the organic matter to be reduced, biologically stabilized, and either recycled (e.g. as an agricultural fertilizer) or disposed of safely (e.g. in a landfill).

While the invention has been particularly shown and described with reference to preferred embodiments thereof, it will be understood by those skilled in the art that various alterations in form and detail may be made therein without departing from the spirit and scope of the invention. In particular, while the invention illustrated by the examples and figures shows a specific size and number of the reactor stages and specific surface aerator design and performance parameters, these and other design features may be widely varied and are not at all limited by the preferred embodiments described herein.

What is claimed is:

1. A continuous flow, enclosed and heat insulated, multistage gas-liquid contacting system for the thermophilic aerobic digestion, pasteurization and stabilization of concentrated wastewater sludge, wherein:

a) each gas-liquid contacting stage contains a separate sludge liquid volume, an enclosed separate gas headspace above the sludge liquid and a gas-liquid contacting device to contact the sludge liquid with the gas in the headspace;

b) the sludge liquid flows from the feed liquid stage serially through the entire multistage system;

c) the gas feed to the multistage system contains at least 20 volume percent oxygen gas and flows directly from the feed gas headspace to one or more other gas headspaces in the multistage system in a predetermined sequence; and d) the sludge liquid temperature reaches a minimum of 58° C. in at least one stage at a sufficient residence time to ensure pasteurization.

2. The continuous flow thermophilic aerobic sludge digestion system according to claim 1 wherein no external heating or cooling is applied to the system.

3. The continuous flow thermophilic aerobic sludge digestion system according to claim 2 wherein no heat exchange equipment is employed.

4. The continuous flow thermophilic aerobic sludge digestion system according to claim 1 wherein the flow of gas through the multistage system is countercurrent with respect to the flow of the staged liquid.

5. The continuous flow thermophilic aerobic sludge digestion system according to claim 1 wherein the flow of gas through the multistage system is cocurrent with respect to the flow of the staged liquid.

6. The continuous flow thermophilic aerobic sludge digestion system according to claim 1 wherein the flow of gas through the multistage system is neither completely cocurrent nor completely countercurrent with respect to the flow of the staged liquid.

7. The continuous flow thermophilic aerobic sludge digestion system according to claim 1 wherein the sludge liquid residence times in the individual stages are not equal.

8. The continuous flow thermophilic aerobic sludge digestion system according to claim 1 having at least three gas-liquid contacting stages.

9. The continuous flow thermophilic aerobic sludge digestion system according to claim 1 having from 5–10 gas-liquid contacting stages.

10. The continuous flow thermophilic aerobic sludge digestion system according to claim 1 wherein sludge temperatures within the system are controlled by one or more techniques selected from the group consisting of: controlling solids concentration of the sludge feed, controlling the oxygen content of the feed gas, controlling the feed gas flow rate, and controlling the temperature of the sludge feed stream.

11. The continuous flow thermophilic aerobic sludge digestion system according to claim 1 wherein said gas-liquid contacting devices are surface aerators.

12. The continuous flow thermophilic aerobic sludge digestion system according to claim 11 wherein said surface aerators provide a high rate of oxygen transfer from the gas phase into the liquid phase and effectively mix the liquid sludge contents of the stages.

13. The continuous flow thermophilic aerobic sludge digestion system according to claim 11 wherein the surface aerator gas-liquid contacting devices additionally include a bottom mixing impeller in one or more stages.

14. The continuous flow thermophilic aerobic sludge digestion system according to claim 1 wherein the oxygen containing gas is air.

15. The continuous flow thermophilic aerobic sludge digestion system according to claim 14 wherein the sludge liquid residence time in one or more of the final stages is greater than that in one or more prior stages.

16. The continuous flow thermophilic aerobic sludge digestion system according to claim 14 wherein the sludge liquid residence time in one or more of the initial stages and in one or more of the final stages is greater than that in one or more of the other stages.

17. The continuous flow thermophilic aerobic sludge digestion system according to claim 1 wherein the oxygen containing gas is oxygen enriched gas containing greater than 21 volume percent oxygen.

18. The continuous flow thermophilic aerobic sludge digestion system according to claim 17 wherein the oxygen containing gas is high-purity oxygen gas containing greater than 80 volume percent oxygen.

19. The continuous flow thermophilic aerobic sludge digestion system according to claim 18 wherein the sludge liquid residence time in one or more of the initial stages is greater than that in one or more subsequent stages.

20. The continuous flow thermophilic aerobic sludge digestion system according to claim 1 wherein the high temperature concentrated sludge is maintained at a temperature of at least 60° C. in at least two stages.

21. The continuous flow thermophilic aerobic sludge digestion system according to claim 1 wherein the total residence time in the entire multistage system is sufficient to reduce volatile suspended solids (VSS) by at least 38 weight percent.

22. The continuous flow thermophilic aerobic sludge digestion system according to claim 21 wherein the total residence time in the entire multistage system is less than 5 days.

23. The continuous flow thermophilic aerobic sludge digestion system according to claim 1 wherein the temperature profile of the multiple stages increases with the liquid flow such that the first liquid stage has the lowest temperature and the last liquid stage has the highest temperature.

24. The continuous flow thermophilic aerobic sludge digestion system according to claim 23 wherein the last and highest temperature liquid stage achieves a temperature greater than about 60° C. and is discharged into alternating batch pasteurization tanks wherein the sludge liquid is held in batch mode at a sufficient time and temperature to ensure pasteurization.

25. The continuous flow thermophilic aerobic sludge digestion system according to claim 1 having more than 1 gas feed stream and at least one feed stream is air.

26. The continuous flow thermophilic aerobic sludge digestion system according to claim 1 having at least three stages and wherein the temperature profile of the multiple stages is such that the highest temperature liquid stage is not the first or last stage and at least the first and last stages are operated in the mesophilic temperature range less than 50° C.

27. The continuous flow thermophilic aerobic sludge digestion system according to claim 1 for producing a pasteurized and stabilized Class A sludge wherein:

i) the oxygen containing gas is air;

ii) the system contains from 4–10 total gas-liquid contacting stages;

iii) at least the first and last stages are operated in the mesophilic temperature range;

iv) at least two adjacent stages are operated in the thermophilic temperature range; and v) the gas staging order is at least partially countercurrent.

28. The continuous flow thermophilic aerobic sludge digestion system for producing a pasteurized and stabilized Class A sludge according to claim 27 wherein the total number of stages is at least five and wherein at least three adjacent intermediate stages are above 60° C.

29. The continuous flow thermophilic aerobic sludge digestion system for producing a pasteurized and stabilized Class A sludge according to claim 27 wherein the temperature of the system is controlled by either controlling the solids concentration of the sludge feed stream or by controlling the air feed flow rate.

* * * * *

UNITED STATES PATENT AND TRADEMARK OFFICE
CERTIFICATE OF CORRECTION

PATENT NO. : 6,966,983 B1
DATED : November 22, 2005
INVENTOR(S) : John R. McWhirter, Prakash G. Balan and Bradley A. Swope It is certified that error appears in the above-identified patent and that said Letters Patent is hereby corrected as shown below:

Column 1,
Line 67, delete "20" and substitute -- 21 --.

Column 7,
Line 23, delete "to operate" and "performance".

Column 8,
Line 19, after "present" insert -- invention --.

Column 15,
Line 20, delete "required".

Columns 15 - 16,
Table 1, line 29, after "Time(days)" delete "26.0 50.2 63.5 67.2 67.6 66.9 65.6 62.6 56.3 46.0".
Table 1, line 30, after "Stage Temp (°C.)" insert -- 26.0 50.2 63.5 67.2 67.6 66.9 65.6 62.6 56.3 46.0 --.

Column 17,
Line 27, delete "was" and substitute -- is --.

Column 18,
Line 14, delete "was" and substitute -- is --.

Signed and Sealed this

Fourth Day of April, 2006

JON W. DUDAS
*Director of the United States Patent and Trademark Office*